United States Patent [19]

Weiler et al.

[11] Patent Number: 5,405,530
[45] Date of Patent: Apr. 11, 1995

[54] SEPARATOR FOR SEPARATING FLOATING AND SINKING MATTER FROM WASTE WATER CONTAMINATED WITH SAID MATTER

[75] Inventors: Walter Weiler, Diez; Gunter Diefenbach, Dornburg; Kurt Helffenstein, Diez, all of Germany

[73] Assignee: Passavant, Germany

[21] Appl. No.: 181,550

[22] Filed: Jan. 14, 1994

[51] Int. Cl.⁶ .............................. B01D 21/24
[52] U.S. Cl. .................. 210/533; 210/535; 210/540
[58] Field of Search ............ 210/513, 532.1, 533, 210/534, 535, 536, 538, 540

[56] References Cited

U.S. PATENT DOCUMENTS

| | | | |
|---|---|---|---|
| 1,079,398 | 11/1913 | Coakley et al. | 210/573 |
| 1,147,881 | 7/1915 | Morris | 210/540 |
| 1,159,044 | 11/1915 | Kelly, Jr. | 210/535 |
| 2,180,811 | 11/1939 | King | 210/533 |
| 3,430,768 | 3/1969 | Stephens | 210/533 |
| 3,762,548 | 10/1973 | McCabe | 210/540 |
| 4,014,791 | 3/1977 | Tuttle | 210/540 |
| 4,111,806 | 9/1978 | Wright et al. | 210/540 |

FOREIGN PATENT DOCUMENTS

| | | |
|---|---|---|
| 3820142 | 12/1989 | Germany . |
| 9104255 | 5/1991 | Germany . |
| 4105567 | 8/1992 | Germany . |
| 55-45243 | 11/1980 | Japan . |
| 492466 | 6/1970 | Switzerland . |

*Primary Examiner*—Christopher Upton
*Attorney, Agent, or Firm*—Larson and Taylor

[57] ABSTRACT

In a gravity-type separator for floating and sinking matter operating without a free level, both the separated floating matter and the separator content must be withdrawn or removed. According to the invention, this is accomplished with a pump that on the suction side has connecting ducts to the vertical center of the separator housing and the sinking matter outlet, and on the pressure side has connecting ducts to the waste water inlet duct and the clean water outlet duct. The pressurized water duct for the floating matter removal is taken from the inlet duct.

5 Claims, 1 Drawing Sheet

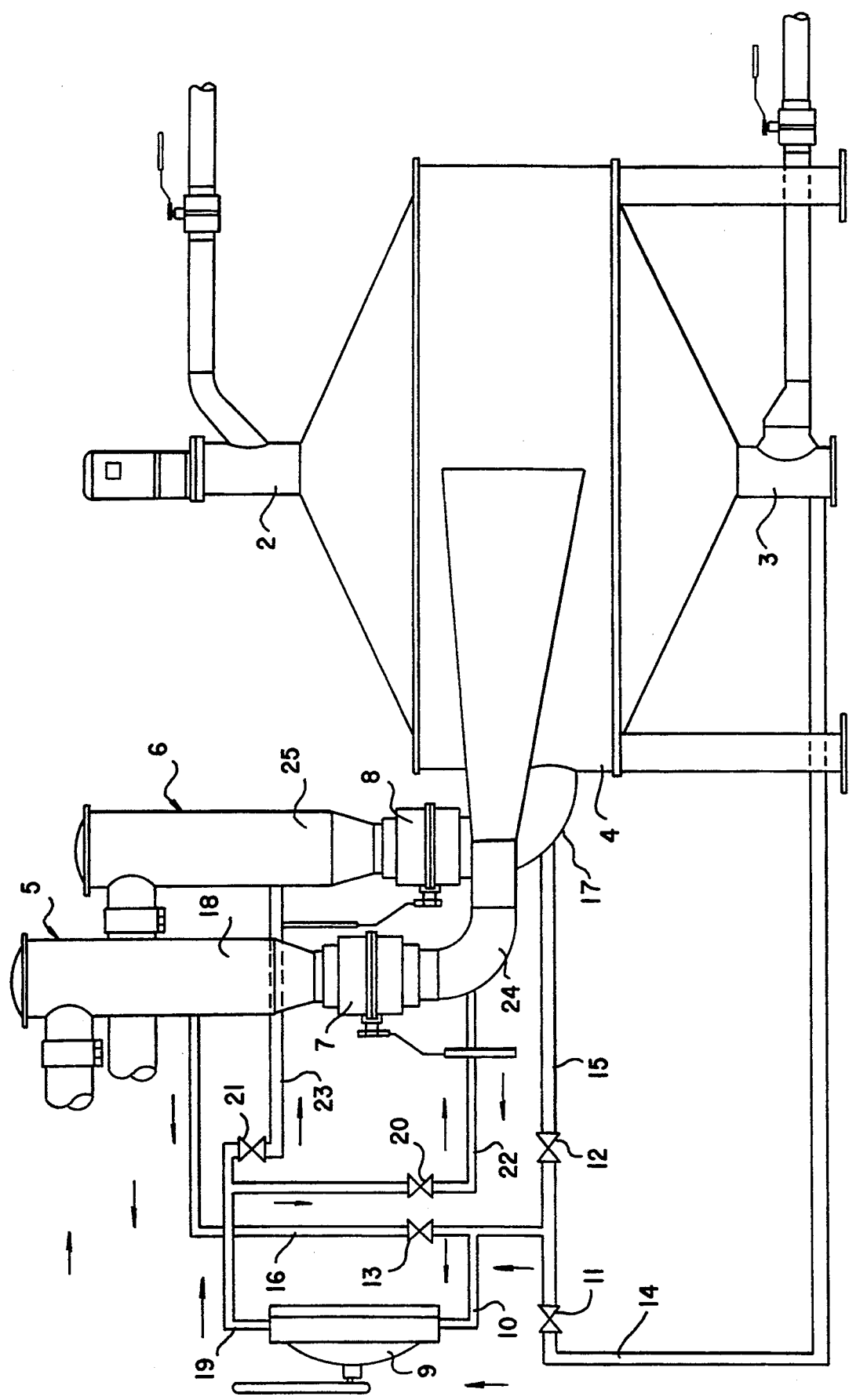

SEPARATOR FOR SEPARATING FLOATING AND SINKING MATTER FROM WASTE WATER CONTAMINATED WITH SAID MATTER

FIELD OF THE INVENTION

The invention relates to a separator, functioning according to the gravity principle, for separating floating and sinking matter from waste water contaminated with said matter. The separator contains a separator housing with an essentially horizontal passage and without a free water level, said separator housing exhibiting a top discharge for floating matter and a bottom discharge for sinking matter. Locking elements are provided inside the waste water inlet/clean water outlet that is pulled up beyond the top floating matter discharge. A pressurized water device (German Application 41 05 567) connected to the separator housing completely removes the floating matter when the locking elements are closed and the floating matter discharge is opened. In the older application, this pressurized water device is a membrane-divided storage bubble that is charged with pressurized air.

BACKGROUND OF THE INVENTION

It was found that in addition to the removal of the floating matter, other processes also must be performed with the separator. It is e.g. sometimes necessary to completely empty the separator housing following the discharge of the sinking matter, and to clean it, if needed, in order to remove residues that could cause an anaerobic reaction of the separated matter. It can also be useful to discharge the separator content at least partially after the floating matter has been removed, in order to enable a control of the raking mechanisms that are possibly present in the separator for thickening the framed floating matter. A partial emptying is also useful if the aqueous phase is drained after the discharge of the floating matter, and if the sinking matter is removed only after this.

SUMMARY OF THE INVENTION

The task of being able to perform these processes with the least equipment possible and the least operating expenditure possible is solved according to the invention by a mutual manual pump that functions as a pressurized water device and is connected for this purpose on the suction side in a lockable manner to the waste water inlet, and is connected on the pressure side in a lockable manner to the section of the waste water inlet that is located down-stream from the locking element. I.e. the pressurized water for removing the framed floating matter is taken from the top section of the waste water inlet. The manual pump is furthermore connected on the suction side in a lockable manner to the sinking matter discharge opening and on the pressure side in a lockable manner to the section of the clean water discharge located above the locking element. In this way, the separator housing can be completely emptied and flushed after the sinking matter has been removed. It is useful that the discharge is controlled in such a manner that the flushing sludge is either removed or passed into a sludge trap. A third lockable suction line starts approximately at the vertical center of the separator housing, i.e. preferably from the section of the clear water discharge located beneath the locking element. This makes it possible to perform a partial emptying, especially of the aqueous phase of the separator. The clean aqueous phase can be discharged into the duct.

BRIEF DESCRIPTION OF THE DRAWING

An embodiment of such a multi-purpose device is shown in the drawing. The numbered arrows indicate the flowing direction of the matter inside the ducts.

DESCRIPTION OF THE PREFERRED EMBODIMENTS

The separator includes a housing 4 constructed as a closed container 1 with a top floating matter discharge opening 2, a bottom sinking matter outlet 3, and a center section 4 positioned therebetween. The bottom sinking matter outlet 3 is connected to the suction side 10 of a manual pump 9 via a branch duct 14 having a valve, or locking element 11 located therein. The center section 4 is connected to the suction side 10 of the manual pump via a branch duct 15 having a locking element 12 located therein.

The separator further includes an elevated waste water inlet duct 5 and the same type of clean water discharge duct 6. The waste water inlet duct 5 has a top section 18, a bottom section 16, and a locking element 7 therebetween. The top section 18 is connected to the suction side 10 of the manual pump 9 via a branch duct 16 having a locking element 13 located therein. The bottom section 24 of the waste water inlet duct 5 is connected to the pressure side 19 of the manual pump 9 via a branch duct 22 having a locking element 20 located therein. The clean water outlet duct 6 has a top section 25, a bottom section 17, and a locking element 8 therebetween. The top section 25 is connected to the pressure side 19 of the manual pump 9 via a branch duct 23 having a locking element 21 located therein. The bottom section 17 of the clean water outlet duct 6 is connected to the suction side 10 of the manual pump 9 via a branch duct 15 having a locking element 12 located therein.

The following manipulations must be performed for the individual functions:

Floating matter removal: The locking element 7 between the top section 18 and bottom section 24 of the waste water inlet duct 5 and the locking element 8 between the top section 25 and bottom section 17 of the clean water outlet duct 6 are closed. The locking element 21 between the top section 25 of the clean water outlet duct 6 and the manual pump 9, the locking element 12 between the center section 4 of the separator and the suction side 10 of the manual pump 9, and the locking element 11 between the bottom sinking matter outlet 3 and the manual pump 9 are also closed. The locking element 13 between the top section 18 of the waste water inlet duct 5 and the pump 9 and the locking element 20 between the bottom section 24 of the waste water inlet duct 5 and the pump 9 are open. By operating the manual pump 9, pressurized water is removed from the top section 18 of the waste water inlet duct 5 and is pumped via branch duct 22 into the bottom section 24 of the waste water inlet duct 5 and thus into the separator housing 4, causing the floating matter to be pressed outwards.

Partial emptying: The locking element 7 between the top section 18 and bottom section 24 of the waste water inlet duct 5 and the locking element 8 between the top section 25 and bottom section 17 of the clean water outlet duct 6 are closed. The locking element 13 between the top section 18 of the waste water inlet duct 5 and the pump 9, the locking element 20 between the bottom section 24 of the waste water inlet duct 5 and the pump 9 and the locking element 11 between the bottom sinking matter outlet 3 and the 5 manual pump 9 are also closed. The locking element 21 between the top section 25 of the clean water outlet duct 6 and the manual pump 9 and the locking element 12 between the center section 4 of the separator and the suction side 10 of the manual pump 9 are 10 open. The water phase is sucked from the separator housing via suction duct 15 and is lifted through branch duct 23 into the top section 25 of the clean water outlet duct 6.

Complete emptying: The locking element 7 between the 15 top section 18 and bottom section 24 of the waste water inlet duct 5 and the locking element 8 between the top section 25 and bottom section 17 of the clean water outlet duct 6 are closed. The locking element 13 between the top section 18 of the waste water inlet 20 duct 5 and the pump 9, the locking element 12 between the center section 4 of the separator and the suction side 10 of the manual pump 9, and the locking element 20 between the bottom section 24 of the waste water inlet duct 5 and the pump 9 are also 25 closed. The locking element 21 between the top section 25 of the clean water outlet duct 6 and the manual pump 9 and the locking element 11 between the bottom sinking matter outlet 3 and the manual pump 9 are open. The pump removes flushing sludge via 30 branch duct 14 from the sinking matter discharge opening 3 and moves it exactly as in the case of the partial emptying into the top section 25 of the clean water outlet duct 6, into the drain.

We claim:

1. A gravity-type separator for separating contaminated floating and sinking matter from waste water, said separator comprising:
    a separator container having a floating matter discharge opening at a top end thereof, a sinking matter outlet at a bottom end thereof, and a center section positioned therebetween;
    a waste water inlet duct having a top section, a bottom section and a locking element positioned therebetween, said bottom section of said waste water inlet duct being connected to said center section of said separator container, at least a portion of said top section of said waste water inlet duct being elevated above said floating matter discharge opening;
    a clean water discharge duct having a top section, a bottom section and a locking element positioned therebetween, said bottom section of said clean water discharge duct being connected to said center section of said separator container, at least a portion of said top section of said clean water discharge duct being elevated above said floating matter discharge opening; and
    a pressurized water device for removing floating matter comprising a pump having a suction side and a pressure side, said suction side being connected to the top section of the waste water inlet duct, to the center section of the separator container and to the sinking matter outlet, said pressure side being connected to the bottom section of the waste water inlet duct and to the top section of the clean water outlet duct.

2. The gravity-type separator according to claim 1 wherein the top section of the waste water inlet duct, the center section of the separator container and the sinking matter outlet are connected to said pump by suction ducts, said suction ducts being combined near an inlet to said pump.

3. The gravity-type separator according to claim 2 wherein the bottom section of the clean water outlet duct is positioned between the center section of the separator container and the suction duct connecting the pump to the center section of the separator container.

4. The gravity-type separator according to claim 1 wherein the top section of the waste water inlet duct contains pressurized water for removing floating matter.

5. The gravity-type separator according to claim 4 wherein the bottom section of the waste water inlet duct and the top section of the clean water outlet duct are connected to said pump by pressure ducts, said pressure ducts being combined near an outlet to said pump.

* * * * *